(12) United States Patent
Brown

(10) Patent No.: US 10,079,738 B1
(45) Date of Patent: Sep. 18, 2018

(54) USING A NETWORK CRAWLER TO TEST OBJECTS OF A NETWORK DOCUMENT

(71) Applicant: Amazon Technologies, Inc., Seattle, WA (US)

(72) Inventor: Robert Anthony Brown, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 217 days.

(21) Appl. No.: 14/946,638

(22) Filed: Nov. 19, 2015

(51) Int. Cl.
*G06F 15/173* (2006.01)
*G06F 17/30* (2006.01)
*H04L 12/26* (2006.01)
*H04L 29/08* (2006.01)

(52) U.S. Cl.
CPC ........ *H04L 43/06* (2013.01); *G06F 17/30864* (2013.01); *H04L 43/04* (2013.01); *H04L 67/02* (2013.01)

(58) Field of Classification Search
CPC ... H04L 29/08072; H04L 29/06; H04L 43/00; H04L 12/2602; H04L 41/22; G06F 17/30864; G06F 17/30867; G06F 17/3089; G06F 17/30997; G06Q 10/10
USPC ......................................................... 709/224
See application file for complete search history.

(56) References Cited

U.S. PATENT DOCUMENTS

| | | | | |
|---|---|---|---|---|
| 2004/0143600 A1* | 7/2004 | Musgrove | ......... | G06F 17/30864 |
| 2008/0228749 A1* | 9/2008 | Brown | ............. | G06F 17/30796 |
| 2010/0287152 A1* | 11/2010 | Hauser | ............. | G06F 17/30864 |
| | | | | 707/707 |
| 2010/0312774 A1* | 12/2010 | Dmitriev | ........... | G06F 17/30864 |
| | | | | 707/759 |
| 2012/0232885 A1* | 9/2012 | Barbosa | ............. | G06F 17/2715 |
| | | | | 704/9 |
| 2013/0177893 A1* | 7/2013 | Feng | ................... | G06F 17/2211 |
| | | | | 434/322 |
| 2013/0332460 A1* | 12/2013 | Pappas | ............. | G06F 17/30705 |
| | | | | 707/740 |
| 2016/0125081 A1* | 5/2016 | Blanco | ............. | G06F 17/30864 |
| | | | | 707/709 |

* cited by examiner

*Primary Examiner* — Mahran Abu Roumi
(74) *Attorney, Agent, or Firm* — Kilpatrick Townsend & Stockton LLP

(57) ABSTRACT

Techniques for testing a network document may be provided. For example, a test document may specify a test of an object of the network document. A network crawler may be launched to perform the test. The network crawler may be configured to access the network document and to perform the test based at least in part on a test document. In addition, a result of the test performed by the network crawler may be accessed. A metric associated with the network document may be generated based on the result of the test.

19 Claims, 9 Drawing Sheets

USING A NETWORK CRAWLER TO TEST OBJECTS OF A NETWORK DOCUMENT

BACKGROUND

More users are turning to online resources to perform various tasks. The online resources may include web pages and other network resources configured to facilitate the tasks. For example, a web page may provide information about an item, a subject matter, a service, and/or links to other web pages and online resources. In another example, a web page may provide a computing service by, for instance, acting as a portal to a computing resource hosting a service.

Testing an online resource may be important. The importance may depend on the facilitated tasks. Generally, the more crucial a task is, the more important the testing may become. However, the number, type, and/or complexity of online resources and/or tasks keep increasing. This increase may impact the testing.

BRIEF DESCRIPTION OF THE DRAWINGS

Various embodiments in accordance with the present disclosure will be described with reference to the drawings, in which.

DETAILED DESCRIPTION

Figure 1:
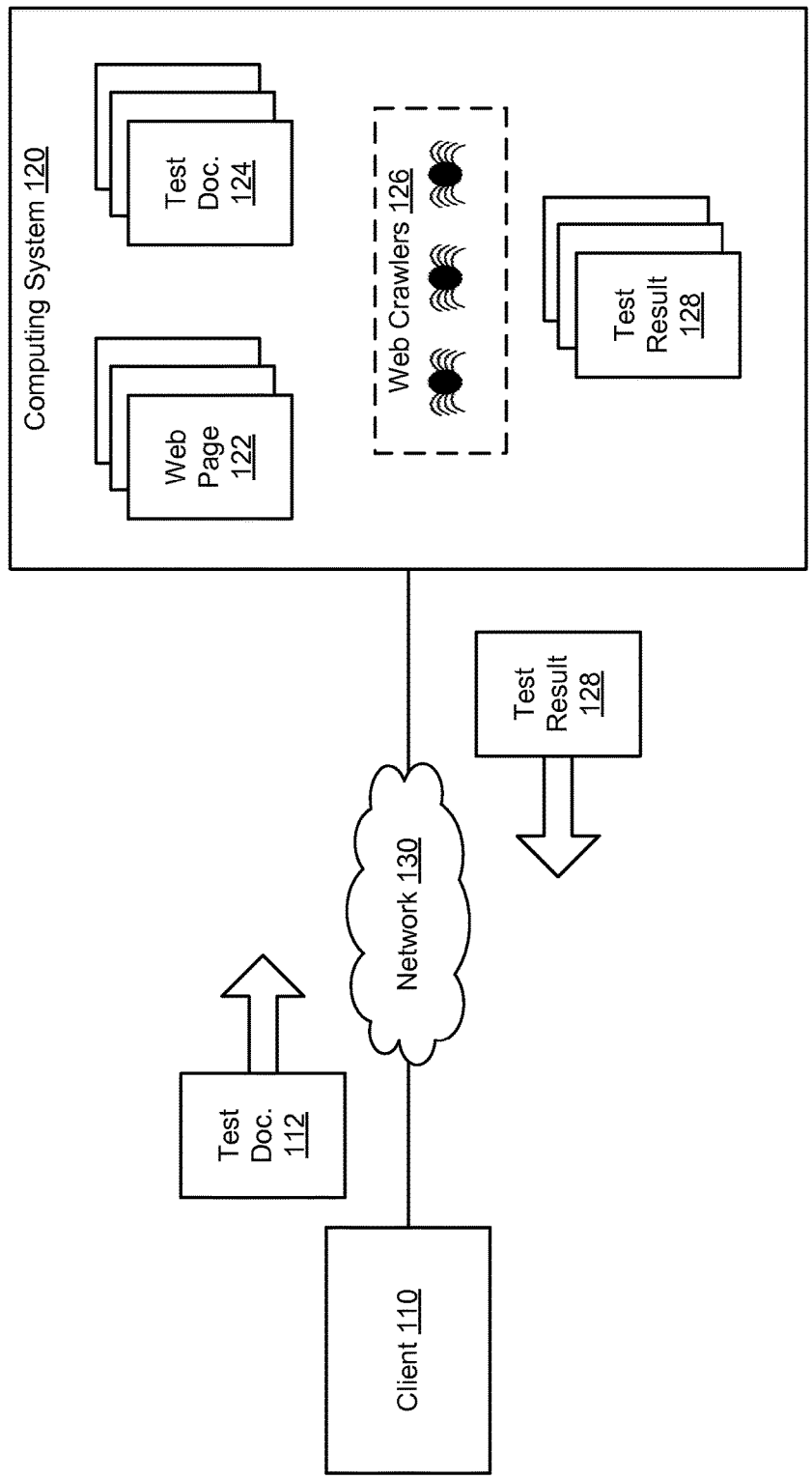
FIG. 1 illustrates an example computing environment for testing an online resource based on a web crawler and a test document, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, testing of online resources. In particular, a test document may be defined for testing an online resource and a web crawler may be used to perform the testing. The test document may specify a set of tests corresponding to different objects of the online resource. The web crawler may crawl the online resource, access and use the test document to test the different objects and identify untested objects, and report a test result. The test result may be analyzed to generate a test metric for the online resource. Over time, the test metric may be updated based on additional testing of the online resource. The test metric may be used for planning some of the additional testing. As such, the embodiments of the present disclosure may decouple the actual testing from the test document by using a web crawler configured to process the test document and accordingly perform the actual testing. In other words, the test document need not hard code the testing. Instead, it may be sufficient to identify the objects in the test document. As such, the test document may be an electronic document listing the set of tests without including executable code or script to actually perform the test. In comparison, the web crawler may be executable code or script stored on a server and configured to, upon execution, crawl a web page corresponding to the test document and perform a set of autonomous tasks. These tasks may be based on the tests specified in the test document. As further described herein, this decoupling may enable different types of testing, such as state-based testing, may simplify the test generation process, and may increase the comprehensiveness of the testing. In addition, by monitoring test metrics over time, better test planning may be achieved.

To illustrate, consider an example of a web page. The web page may include a number of objects and may be configured to provide subscription-based information. Some of the objects may be static elements such as text and/or graphic elements. Other objects may be actionable elements such as links, form buttons, or other user interface (UI) elements that may result in an action when selected or activated. A test document may be specified for a subscription state to test what a user would experience if logged into the web page using that subscription state. The test document may identify a static element, such as text describing the user as being logged in according to the subscription state. The test document may also identify an actionable element, such as a link to another web page exclusively available to a user logged in according to the subscription state. A web crawler may be selected to test the web page. The web crawler may access the web page using the subscription state. The web crawler may then verify whether the web page includes the two static and actionable elements, the respective properties, and an outcome of the actionable element (e.g., whether the other web page is properly linked). The web crawler may also report other objects that may have been found in the web page but not tested based on the test document. The result of the test may be analyzed to determine a quality of the web page. For example, if any of the two objects is missing, a property is different from what is expected, the actionable outcome is not what is expected, and/or a reported object should not have been found in the web page, a negative quality metric may be generated. In addition, a new test document may be used to test the reported, untested objects. As such, the web page may be tested over time using different test documents and for different states. If particular objects have been tested at an acceptable frequency, subsequent testing may omit these objects; otherwise, these objects may be tested again.

In the interest of clarity of explanation, the embodiments of the present disclosure may be described in connection with quality testing of a web page based on using a test document and a web crawler. However, the embodiments are not limited as such. Instead, the embodiments may similarly apply to other types of testing and/or online resources. For example, security testing may also be performed. In this example, the test document may identify various security-related objects, respective properties, and/or outcomes. For instance, the test document may check whether certain objects use a particular security protocol and/or a particular certificate. The web crawler may accordingly perform the security testing and provide reports. The reports may be analyzed to generate a security metric.

In the interest of clarity of explanation, the embodiments of the present disclosure may be described in connection with using a web crawler. However, one of ordinary skill in the art would understand, in light of the present disclosure, that using a web crawler may involve using an application and/or computer-readable instructions stored in memory and upon execution with a processor, implement the web crawler for the described use.

Turning to FIG. 1, the figure illustrates an example computing environment for testing a quality of a web page. As illustrated, the computing environment may include a client 110 in communication with a computing system 120 over a network 130. The client 110 may provide a test document 112 to the computing system 120 for testing a web page 122. The computing system may select a web crawler from a plurality of web crawlers 126 to perform the testing based on the test document 112. Upon completion of the testing, the computing system may provide a test result 128 to the client 110 indicating a quality of the web page 122. Each of these components is described herein next.

In an example, the client 110 may represent a computing device of an administrator of a web site. The web site may include the web page 122. The administrator may operate the client 110 to generate the test document 112. The test document 112 may represent an electronic document or some other digital file that may be used to test the web page 122. For instance, the test document 112 may identify particular objects that should be tested, the test for each of these objects, and a state for the testing. The state may include a set of information for use when browsing the web page 122 and may impact how the web page 122 may be browsed and/or the functionalities of the web page 122. For example, the state may represent a user logged in based on a particular subscription to the web site, as the administrator, or other user-related states. The objects may include static and actionable elements that are expected to be found in the web page 122. The test of a static element may involve, for instance, determining whether that element is present in the web page 122 and the properties of the element if found. The test of an actionable item may further involve, for instance, determining whether an outcome of performing the action defined by the actionable element is the expected outcome. In addition, the objects to be tested may include some objects that are expected not to be found in the web page 122. Finding one of these objects may indicate a quality issue. For instance, if a new version of the web page 122 is rolled out, resulting in an object becoming outdated, the quality of the new version may be penalized if that object is nonetheless found. The client 110 may provide an interface (e.g., drive a user interface presentable to the administrator via a peripheral of the client 110) to facilitate the administrator's various operations. For example, the interface may be configured to enable the administrator to generate the test document 112, request a test of the web page 122, and access or receive the test result 128.

The web page 122 may be an example of a network document and the web site may be an example of an online resource. Other types of online resources and/or network documents may be similarly tested. For instance, the quality of a network document stored at a network location may be tested. The network document may represent a document that may be accessible over a network. A storage service may store the network document along with other network documents at the network location and may manage access to these network documents based on, for instance, user credentials.

In an example, the computing system 120 may include a plurality of computing resources. These resources may be configured to provide the test result 128 and more generally the quality testing to the client. FIG. 1 illustrates one example configuration where the computing system 120 hosts the web page 122 (and the respective web site). In this example, the computing system 120 may be administered by the same administrator of the client 110. Other configurations may also be implemented, including distributed computing architectures. For example, and as further illustrated in FIG. 2, the computing system 120 may not host the web page 122. Instead, the computing system 120 may be configured to provide a computing service to the client 110 for assessing the quality. In this example, the computing system 120 may be administered by a different administrator. The computing service may be provided to the client 110 as a subscription-based service that may necessitate a subscription or client account with the computing system 120.

As illustrated in FIG. 1, the computing system 120 may host the web page 122. The computing system 120 may also store test documents 124 for testing different web pages. These test documents 124 may include, for instance, the test document 112. In addition, the computing system may store the plurality of web crawlers 126. A web crawler may represent an example of a network-based bot, such as an Internet bot, for browsing web pages and running automated tasks. The web crawler may be stored as a software application (e.g., the software application may include instructions for implementing the web crawler and the instructions may be stored on one or more computer readable media), where functionalities of the web crawler may be written using any programming language such as a scripting language (e.g., JavaScript). Implementing, launching, and/or deploying the web crawlers may include executing the instructions and/or or providing instructions for another computing device to execute the instructions. Some or all of the web crawlers 126 may be associated with states. For instance, a particular web crawler may be configured to crawl a web page at a particular user-related state such that the web page is browsed with the particular user-related state.

Generally, the computing system 120 may be configured to generate a test plan for testing the web pages. The test plan may include a graph that identifies a sequence of web pages to test and the respective test documents. The computing system 120 may select one of the web crawlers 126 to perform the test plan and test the different web pages given the respective test documents. For example, the computing system 120 may identify an entry point (e.g., what web page to start with), the pathway (e.g., the sequence of the web pages), and an exit point (e.g., what web page to end the test at) to the web crawler. The computing system 120 may also identify a destination (e.g., a particular network storage location) to the web crawler for reporting the test results. The web crawler may access the web documents, crawl through the web pages, perform the tests defined in the test documents, and report the test results to the destination in an automated manner.

The test results may be stored at the destination and may include the test result 128. The computing system 120 may be configured to provide the test result 128 and/or to analyze the test result and provide a quality metric to the client 110 over the network 130. As such, the computing system 120 may be capable of tracking what web pages and/or objects per web page may have been tested or not tested and under what state. The computing system 120 may also be capable of tracking what test documents and/or web crawlers may have been used and when, the test results, and quality metrics of the different web pages. The quality metrics may be usable for the administrator of the client 110 to monitor qualities of the different web pages and, as needed, define additional test documents, request additional testing, and/or update the objects of the web pages (e.g., to fix bugs).

In addition, based on relevance or degree of importance of each web page (e.g., a web page with higher user traffic may be more relevant than one that is less frequently visited) or the history of testing of the web page, the computing system 120 may use the different tracked data to generate a saturation level for that web page. Subsequent testing of a web page may depend on the respective saturation level. For example, if the saturation level is too high, the web page may have been tested frequently enough and, thus, may no longer be tested for some period of time. The use of relevance and saturation level is further described herein.

In an example, the network 130 may represent a data network configured to communicatively couple the client 110 and the computing system 120. The network 130 may include a public network (e.g., the Internet) and/or a private network (e.g., an intranet).

Hence, the computing environment of FIG. 1 may allow testing of web pages in a comprehensive, automated and streamlined manner. In particular, the actual testing may be decoupled from test documents. Instead of hardcoding the testing of a web page in a test document or a particular web crawler, the test document may be written to specify what objects should be tested, the type of testing, and a state of the testing. The computing system 120 may select a web crawler based on, for instance, a match between the state of the testing to a state of the web crawler. The web crawler may crawl the web page and use the test document to perform the testing and report test results. The computing system 120 may analyze the test results, generate quality metrics, monitor over time the saturation level related to testing the web page (e.g., how often that web page has been tested, what objects have been tested and what are the remaining objects, etc.), and plan for subsequent testing.

Figure 2:
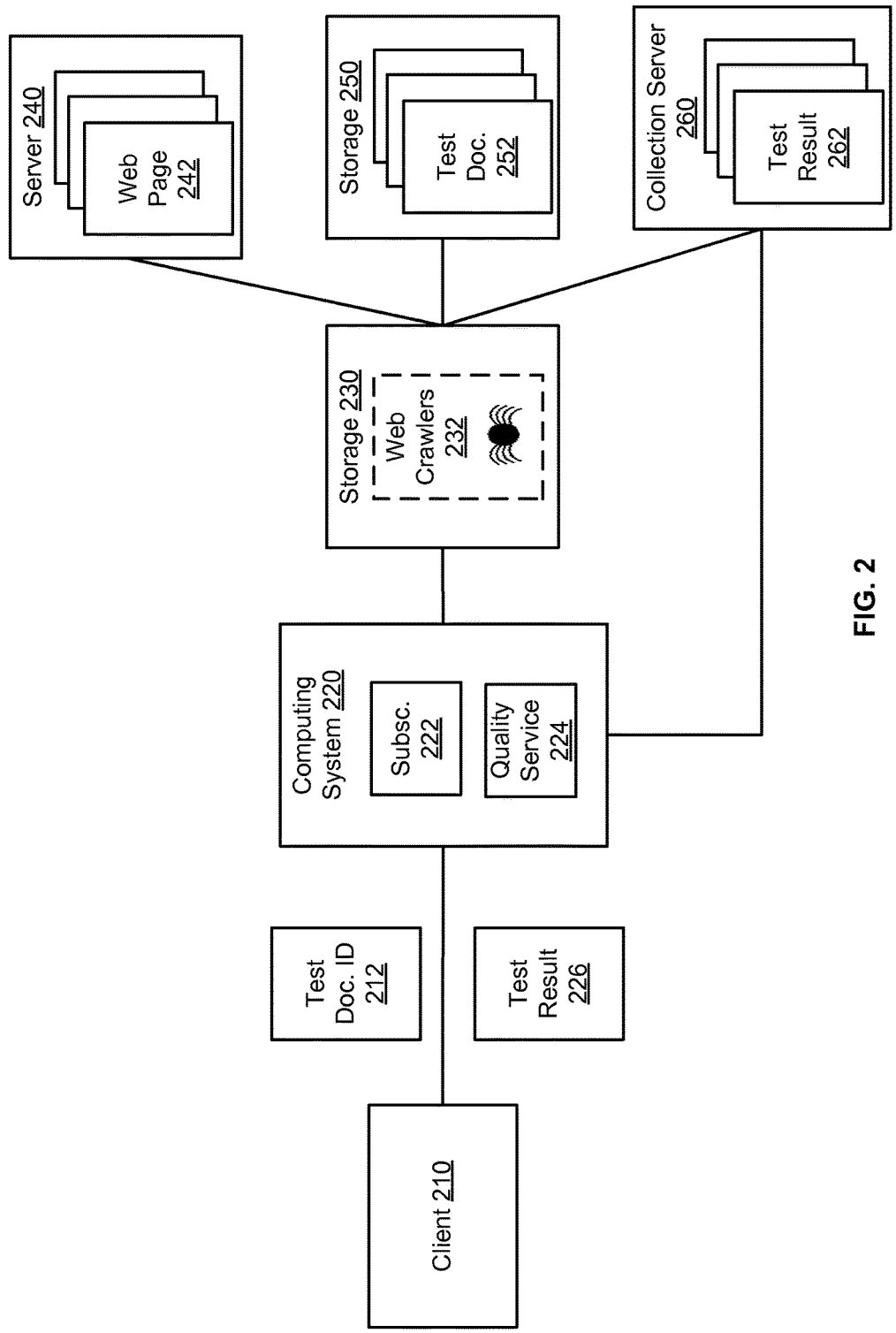
FIG. 2 illustrates another example computing environment for testing an online resource, according to embodiments.

The computing system of FIG. 1 illustrates an example where the client 110, the web page 122, and the computing system 120 may share a same administrator. However, the embodiments may not be limited as such. Instead, other configurations of the computing environment may be used. FIG. 2 illustrates one such example. In particular, FIG. 2 illustrates a distributed computing environment where testing a quality of a web page may be provided as a computing service to a client based on a client subscription. Providing the computing service may involve a front end and a back end. The front end may be configured to facilitate an interface between the client and the computing system. The back end may be configured to facilitate the testing using different computing resources. These computing resources may be distributed as illustrated in FIG. 2. Nonetheless, some or all of these computing resources may be alternatively consolidated in other examples.

As illustrated in FIG. 2, a client 210 may interface with a computing system 220 over a network (not shown). In an example, the client 210 may have a subscription 222 with the computing system 220. The subscription 222 may represent a client account defining different computing services that may be available to the client 210. Among these computing services may be a quality service 224. The quality service 224 may represent a computing service for testing and managing the testing of web pages.

In an example, the client 210 may log in to the quality service 224 using the subscription 222. Once logged in, the client 210 may upload a test document, interface with quality service 224 to generate a test document for a web page, or provide an identifier 212 of a test document that may already exist. In turn, the quality service 224 may be configured to run the testing by using the test document and one or more web crawlers. Once the testing is complete, the quality service 224 may analyze a test result 226 and provide information about the test result 226 and the analysis to the client 210. The provided information may include the test result 226, a quality metric, and/or a saturation level related to testing the web page, may identify objects of the web page that may not have been tested, may identify potential quality issues (e.g., potential bugs in the web page), and/or may schedule a next test.

The testing may involve different computing resources. For example, the computing system may interface with a network storage 230 storing web crawlers 232. The quality service 224 may select one or more of the web crawlers 232 to perform the testing. The quality service 224 may provide different information to the selected web crawler(s). For example, quality service 224 may identify the web page (illustrated as a web page 242 hosted on a server 240), a network storage 250 storing the test document (illustrated at a test document 252), and a collection service 260 for reporting the test result (e.g., illustrated as a test result 262). In turn, the web crawler(s) may access the test document 252 from the network storage 250 to identify the automated tasks that should be performed. These automated tasks may be defined in the test document 252 and include checking whether an object of the web page 242 is present in the web page 242, the properties of the object, and/or an outcome of activating the object if applicable, and/or reporting untested objects of the web page 242 at particular document object model (DOM) levels of the web page 242. The web crawler(s) may crawl the web page 242 hosted on the server 240, perform the automated tasks, and report the test result 262 to the collection server 260. The quality service 224 may then access test result 262 to perform an analysis and provide the related information as a test result 226 to the client 210.

Hence, the computing environment of FIG. 2 may allow any client to test the quality of any web page as long as the client may have the proper subscription (or credential/authority) to perform the testing. The computing system 220 may enable the client to generate or select a test document for a web page and may launch a web crawler to test the web page. The computing system 220 need not host the web page. Instead, the web page 242 may be hosted on a remote server 240.

Figure 3:
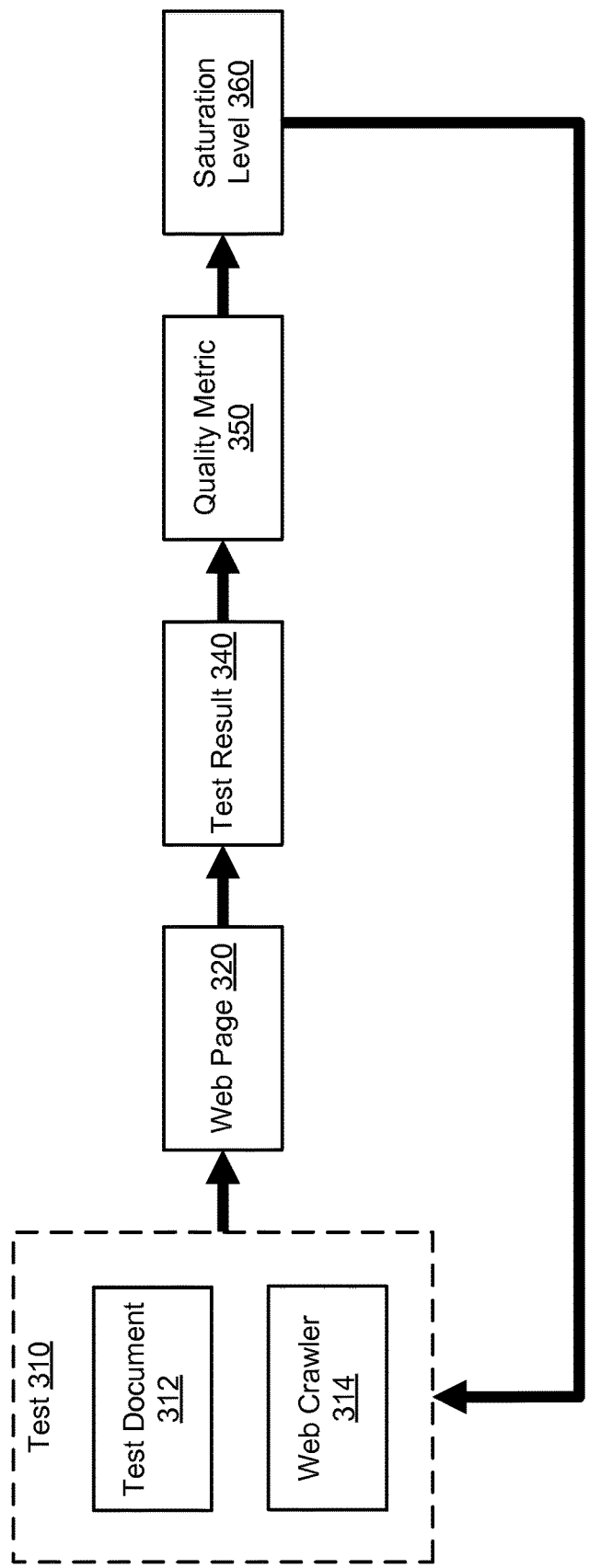
FIG. 3 illustrates an example of testing an online resource over time, according to embodiments.

As described herein above, testing a web page may involve using a test document and a web crawler. In comparison, managing the testing may involve using a saturation level. The managing may include selecting particular test documents and web crawlers and scheduling the testing given the saturation level. This may allow testing the web page and/or objects within the web page only as needed rather than excessively. FIG. 3 illustrates an example of using the test document, the web crawler, and the saturation level.

As illustrated in FIG. 3, a test 310 may be planned for a web page 320. The test 310 may be defined in a test document 312 and may be performed by a web crawler 314. In particular, the web crawler 314 may crawl the web page 320, perform the test using the test document 312, and generate a test result 340.

The test result 340 may include various types of information. Some of the information may relate to the context of the test 310. For example, the test result 340 may identify the web page 320 (e.g., a uniform resource locator (URL)), the objects that were tested (e.g., tags of the objects), the web crawler 314 (e.g., a unique identifier), the timing of the test 310 (e.g., a time stamp), and the state used to perform the test (e.g., a descriptive identifier). Other information may relate to an actual result of the test. For example, the test result 340 may identify whether an object is present in the web page 320, the properties of the object, and/or an outcome of any applicable action. The test result 340 may also identify an object that was found on the web page but not identified in the test document 312 for testing. The information may be used in different ways. In one example, the information may be analyzed to generate a quality metric 350. In another example, the information may be used to generate a saturation level 360 and accordingly manage the overall testing. This may include tracking what has been tested and the frequency of such testing and accordingly planning for subsequent testing.

The quality metric 350 may represent a metric indicative of a quality of the web page 320 based on the test 310. The quality metric 350 may be qualitative (e.g., high, medium, low) or quantitative (e.g., a grade on a 1-to-5 scale). The actual metric may depend on the test result 340 and may be generated using different factors. An example factor is deviation. The deviation may be defined along one or more dimensions: object not present when expected to be present, object having a different property than expected, and/or an action of an object resulting in an unexpected outcome. Generally, the larger the deviation from an expected result, the lower the metric may be. Another example factor is the number of identified objects that have not been tested and the DOM level of these objects. Generally, the larger the number and the higher the DOM level is, the lower the metric may be. Yet another example factor is the history of testing. If an object has been previously tested and a respective issue has been identified, the metric may be relatively lower if the current test 310 also identifies that the same issue remains.

The saturation level 360 may represent a level that, if exceeded, would indicate that a high frequency or a more than sufficient number of tests of the web page 320 (or of particular objects thereof) has already been performed. Exceeding the level may be relative to a threshold. That threshold may depend on the relevance of the web page 320 (or of the objects). Generally, the higher the relevance, the higher the threshold may be. The saturation level may also decay over time if no additional testing is performed. For example, the saturation level may be reduced by a particular amount if a time period elapses without a test being performed. The decay rate and amount may also depend on the relevance of the web page 320 (or of the objects). Generally, the higher the relevance, the faster the decay rate and the larger the decay amount may be. Once the saturation level decays below the threshold, additional testing may be further planned and performed (illustrated in FIG. 3 by an arrow showing a loop between the saturation level 360 to the test 310). The relevance of the web page 320 may be generated based on different factors. One example factor may include the user traffic to that web page. The higher the user traffic, the more relevant the web page 320 may be. Another factor may include a functionality of the web page 320 (or of an object of that web page 320). For example, if the functionality is a login page or if the web page 320 includes a "buy button" allowing users to conduct transactions, the relevance may be high. In comparison, if the functionality is limited to providing descriptive information, the relevance may be relatively lower. Yet another example may include a history of testing of the web page. For instance, if the history indicates bad quality (e.g., a quality metric falling below a threshold or a number of bugs exceeding a threshold), the decay rate may be increased relative to a web page having a good quality history. As such, the worse the quality of a web page, the larger the decay rate may become and, accordingly, the more often the web page may be tested.

As such, the saturation level 360 may allow managing, for example, the frequency and timing of the test 310, what web pages should be tested, and what objects of a web page should be tested. If a saturation level of a web page is not exceeded (relative to the respective threshold), that web page should be tested again. Conversely, if the saturation level is exceeded, the web page should not be tested again until the saturation level drops below the respective threshold. Similarly, if a saturation level of a first set of objects within a web page is not exceeded but is exceeded for a second set of objects within the web page, the first set but not the second set should be tested again.

The saturation level 360 may be generated from the tracked information described herein above in connection with the test result 340 and/or the quality metric 350. In an example, one or more counters may be used. The value of the counter may represent the saturation level 360. A counter may be increased if a testing is performed, and may be decreased to reflect a decay. The amount of increase and decrease may depend on the relevance of the web page 320, as described herein above (e.g., based on user traffic to, functionality of, or history of testing of the web page). For instance, the higher the relevance, the lower the increase amount may be (e.g., to allow a slower saturation and, thus, more frequent testing) and the higher the decrease amount may be (e.g., to allow a faster decay rate and, thus, more frequent testing). A counter may be specified for each of types of the tracked information and/or collectively for the overall information. For example, a counter may be defined for the web page, an object of the web page, a set of objects, a state, a test document, and/or web crawler.

Hence, a test involving a test document and a web crawler may provide flexibility and comprehensiveness in the testing. Because the test document need not hardcode the test, it may be sufficient to update the test document and/or select the web crawler (e.g., based on a state) to test different objects of a web page under different states. In addition, using a saturation level may improve management of the testing. In particular, the saturation level may allow tracking of what web page, objects, and states may have been tested, how often, and/or the timing of the testing. As such, subsequent testing may be properly scheduled.

Figure 4:
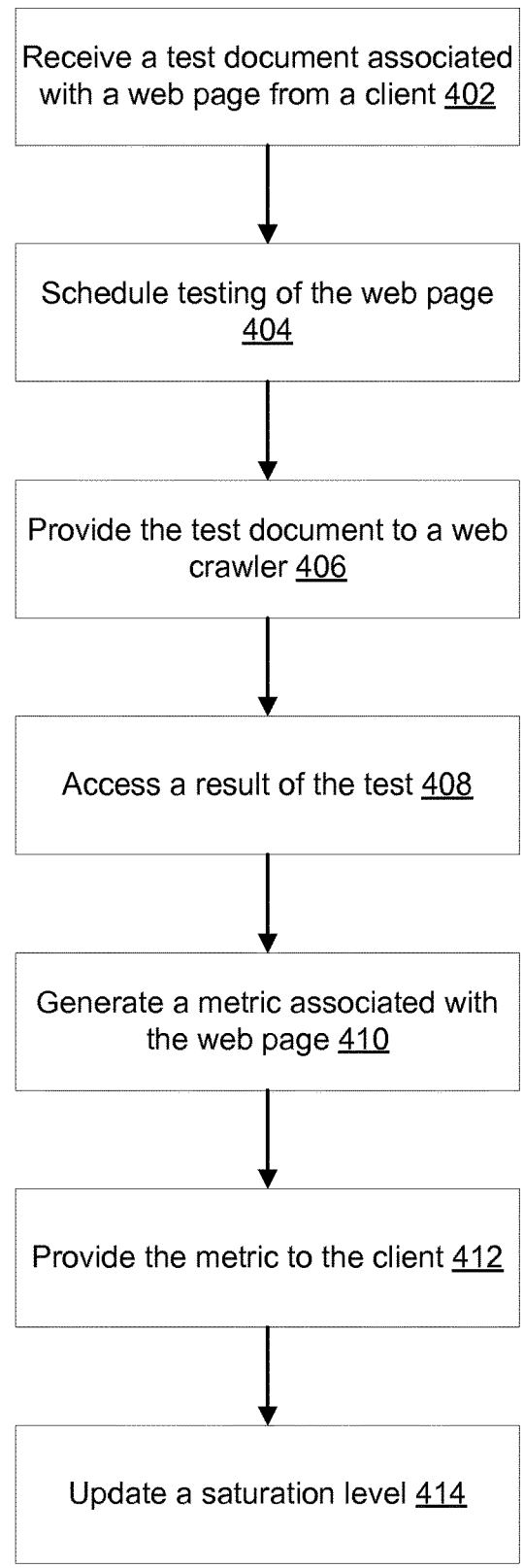
FIG. 4 illustrates an example flow for testing an online resource based on a web crawler and a test document, according to embodiments.
Figure 5:
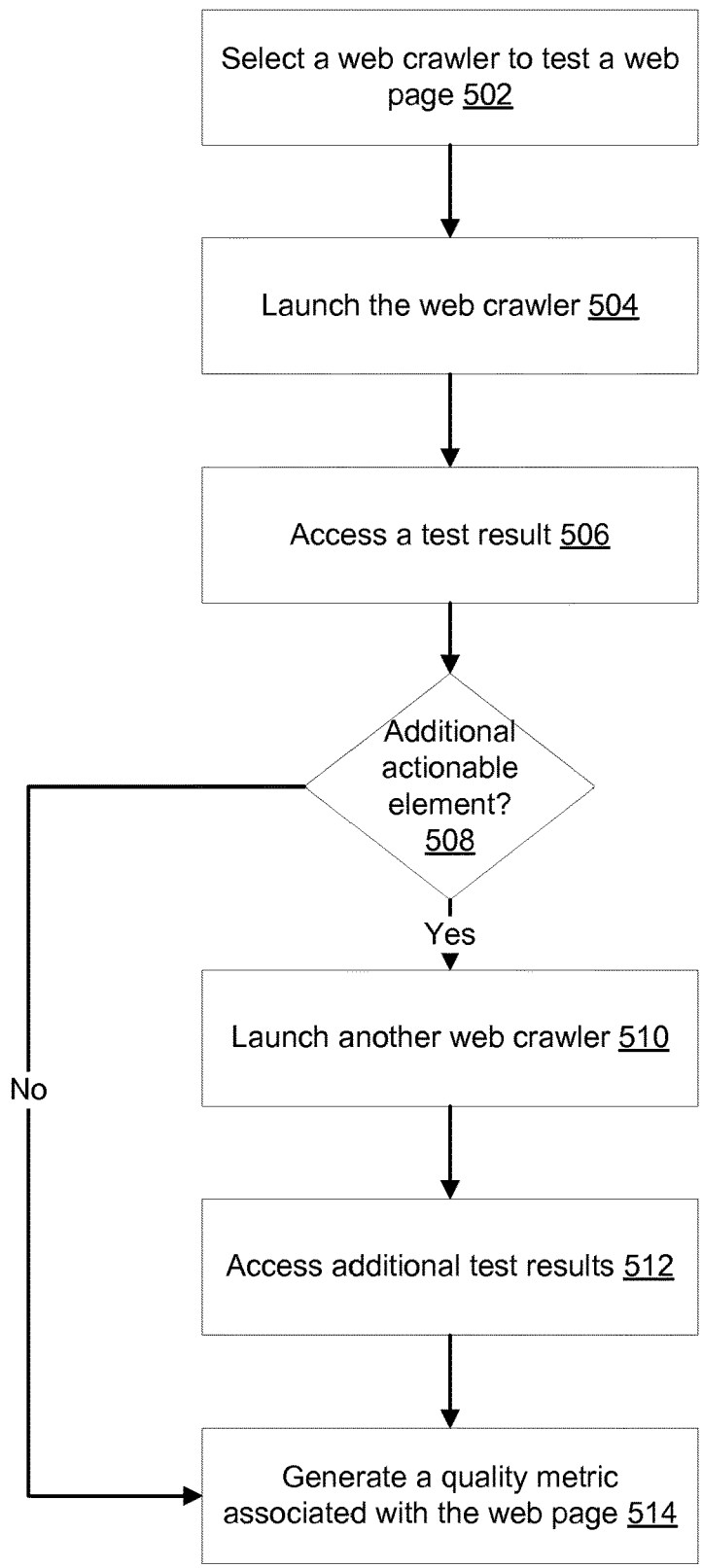
FIG. 5 illustrates an example flow for selecting a web crawler and testing an online resource, according to embodiments.
Figure 6:
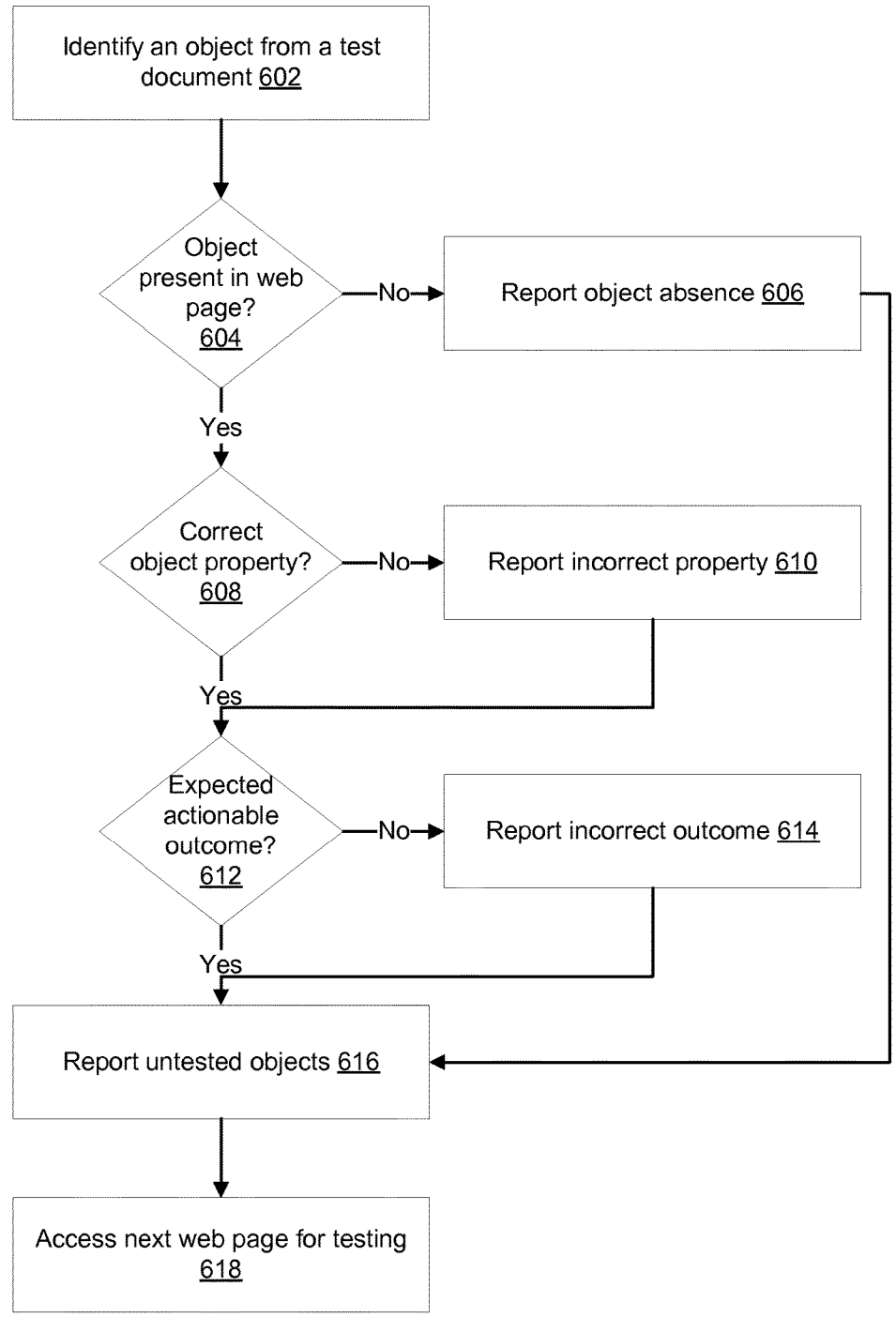
FIG. 6 illustrates an example flow for testing objects of an online resource identified in a test document, according to embodiments.
Figure 7:
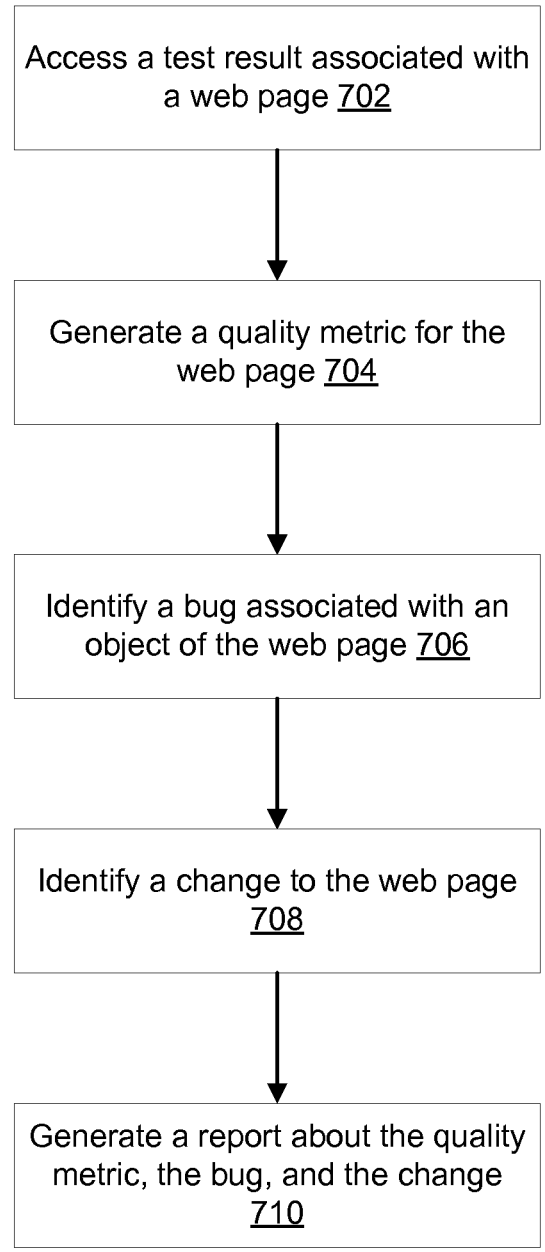
FIG. 7 illustrates an example flow for generating a test report, according to embodiments.
Figure 8:
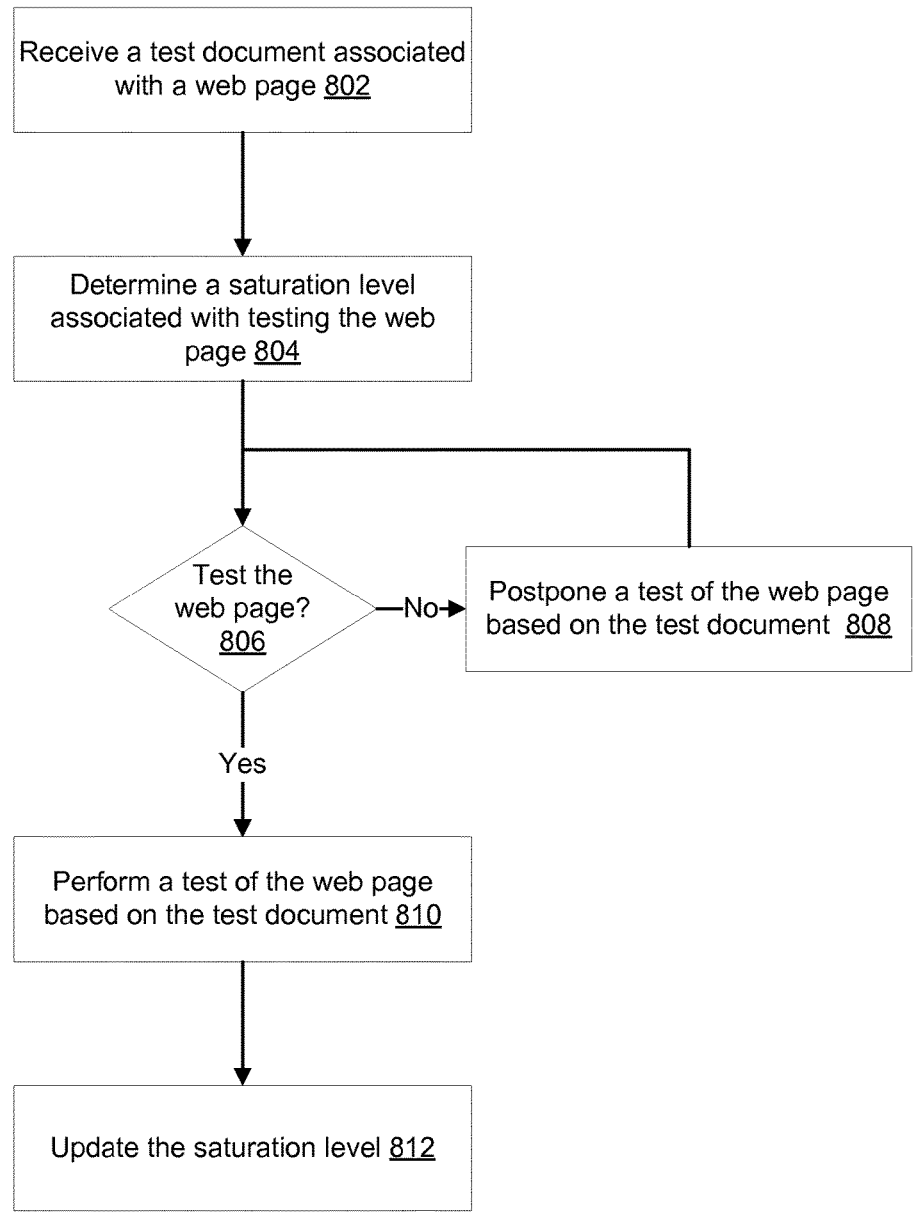
FIG. 8 illustrates an example flow for testing an online resource over time based on a testing saturation level, according to embodiments.

Turning to FIGS. 4-8, the figures illustrate example flows for testing web pages. In particular, FIG. 4 illustrates an example flow for providing a test result to a client based on usage of a test document and a web crawler. In comparison, FIG. 5 illustrates an example flow for selecting and using a web crawler to test a web page. FIG. 6 illustrates an example flow for reporting test results. FIG. 7 illustrates an example flow for analyzing test results to generate an assessment of a web page. FIG. 8 illustrates an example flow for using a saturation level to manage a testing of a web page. Some operations across the example flows may be similar. Such similarities are not repeated herein in the interest of clarity of explanation.

In the interest of clarity of explanation, a computing system and/or a web crawler may be described as performing some or all of the illustrative operations. However, a person of ordinary skill in the art would understand that some or all of the operations or functions may be embodied in, and fully or partially automated by, components executed by one or more processors. For example, a quality service hosted on the computing system may be used. Other, or a combination of other, modules and computing resources may be additionally or alternatively used. Also, while the operations are illustrated in a particular order, it should be understood that no particular order is necessary and that one or more operations may be omitted, skipped, and/or reordered.

Turning to FIG. 4, the example flow may start at operation 402, where a test document associated with a web page may be received. For example, the computing system may receive the test document from a client. In another example, the computing system may receive information from the client and, accordingly, generate the test document. In yet another example, the computing system may receive a request to test the web page from the client. The request may include the test document or an identifier of the test document. The test document may specify a test for a set of objects that the web page may be expected to include.

At operation 404, testing of the web page may be scheduled. The testing may involve usage of the test document and a web crawler. In an example, the computing system may schedule the testing based on a saturation level. The saturation may be related to the web page or the set of objects that should be tested. The computing system may set a time period to perform the testing such that, when performed, the saturation level may not be exceeded. In addition, the computing system may account for other testing. In an example, the other testing may relate to the web page but involve other objects. For instance, another test document may have also been received to test the other objects. The computing system may use one web crawler to test all of the objects at the same time in such a way that the two test documents may be thought of as being merged. In another illustration, the computing system may use separate web crawlers and schedule these web crawlers to perform the respective testing at different times such that the web page is not simultaneously crawled by multiple web crawlers. In another example, the testing may relate to other web pages. For instance, the computing system may schedule a web crawler to test a plurality of web pages based on respective test documents. The testing of the web page may be scheduled to be a part of this overall testing. Of course in this illustration, each of the web pages may be tested depending on a respective saturation level.

At operation 406, the test document may be provided to a web crawler. For example, the computing system may select the web crawler based on one or more factors, as further illustrated in FIG. 5 (e.g., operation 504). The computing system may also identify a network location storing the test document and the web page to the web crawler. In turn, the web crawler may access the test document, identify the objects to be tested and the respective test, and may accordingly crawl to the web page and perform the test as a set of autonomous tasks.

At operation 408, a result of the test may be accessed. For example, the web crawler may send test results to a collection server or directly to the computing system as further illustrated in FIG. 6. In turn, the computing system may access such test results for analysis. At operation 410, a metric associated with the web page may be generated. For example, the computing system may analyze the test results to generate the metric as further illustrated in FIG. 7. The metric may include a quality metric indicative of a quality of the web page.

At operation 412, the metric may be provided to the client. For example, the computing system may send the metric to the client in response to the request to test the web page. In addition or alternatively, the computing system may send other information associated with the testing to the client. For example, the computing system may send the test results and/or the saturation level. If a test result is sent without a corresponding metric, the client may implement similar techniques to analyze the test result and generate the metric.

At operation 414, the saturation level may be updated. For example, the computing system may increase the saturation level by a particular amount based on the completion of the testing. The increase amount may depend on the relevance of the web page.

FIG. 5 illustrates a further example flow for using the web crawler to perform the testing. As described in this example flow, the web crawler may be selected based on one or more factors. The selected web crawler may be launched to perform the testing. If the testing involves multiple actionable elements, the web crawler may test one of these elements. In addition and while the testing is performed, additional web crawlers may also be launched to test remaining actionable elements.

The example flow of FIG. 5 may start at operation 502, where a web crawler may be selected to test a web page, or objects within the web page, according to a test document. For example, the computing system may select the web crawler from available web crawlers based on different factors. An example factor may include a state for the testing. In particular, the test document may correspond to a state associated with browsing the web page. The computing system may select the web crawler based on a capability to crawl the web page using that state. Another example factor may include testing of other web pages. For instance, the computing system may have already selected the web crawler to test the other web pages. If further scheduling the web crawler to test the web page is feasible, the web crawler may be selected accordingly.

At operation 504, the web crawler may be launched. For example, the code of the web crawler may be executed to perform crawling of web pages and perform various autonomous tasks. The computing system may identify a crawling path for the web crawler (e.g., what web pages to crawl and in what order) and may provide the web crawler with access to the respective test documents. In an example, this may involve configuring the web crawler to follow the crawling path (e.g., by providing the URLs and the order as a set of inputs or configuration variables to the web crawler) and autonomously perform a respective test at each web page (e.g., by providing the test defined in each document as a set of tasks or configuration variables to the web crawler).

At operation 506, a test result may be accessed. In an example, the web crawler may provide a test result per tested object. In another example, the web crawler may provide a test result that may correspond to a plurality of tested objects. A test result may indicate whether an object(s) was found in the web page, and the respective property or properties. A test result may also identify objects that were found but have not been identified or tested based on the test document. In turn, the computing system may access the test result(s) and perform a quality analysis.

At operation 508, a determination may be made as to whether an additional actionable element should be tested. As described herein above, the test document may identify multiple objects that should be tested. Some of these objects may be static elements. Other objects may be actionable elements. The web crawler may test an actionable element by activating the action corresponding to that element and checking an outcome of the action. An outcome may generally relate to another web page. For instance, the actionable element may be a link to another web page. In this illustration, the web crawler may follow the link and check whether the resulting web page is the expected one. As such, testing an actionable element may move the web crawler to a different web page.

In an example, the web crawler may crawl back and forth between the web page under test and the other web pages associated with the actionable elements. In another example, this back and forth crawling may be avoided. Instead, the web crawler may check one of the actionable elements. In this example, the computing system may select and launch other web crawlers to check the remaining actionable elements. As such, the computing system may use the determination as to whether an additional actionable element should be tested. If so, operation 510 may be performed where another web crawler may be selected and launched; otherwise, operation 514 may be performed where a quality metric may be generated.

Various techniques may be used to determine whether the additional actionable element should be tested. In one example technique, the computing system may parse the test document and identify the additional actionable element. In this case, the computing system may instruct the web crawler to check only one (or a particular set) of the actionable elements, while scheduling another web crawler for testing the additional element. In another example technique, the computing system need not parse the test document. Instead, a set of rules may be defined. The computing system may use a set of rules to instruct the web crawler what actionable element(s) to test. Alternatively, the set of rules may be directly accessible to the web crawler to determine the testable actionable element(s). In this example, upon identifying an actionable element, the web crawler may look up the set of rules, or may communicate with the computing system to receive instructions based on the set of the rules, to determine if the actionable element should be tested. If so, the web crawler may perform the test. In addition, the computing system may determine, directly based on the set of rules, or based on communications with the web crawler, what actionable elements would not be tested by the web crawler. Accordingly, the computing system may schedule other web crawlers to test these objects. To illustrate, consider an example of three actionable elements. The set of rules may specify that the web crawler may test the first identified actionable element. Accordingly, the web crawler may test that first element. The computing system may launch two other web crawlers to test each of the remaining two actionable elements.

At operation 510, another web crawler may be launched. This operation may be similar to operation 504 with a few differences. One example difference may relate to the scope of the testing to be performed by the other web crawler. For example, the computing system may launch the other web crawler to test only the additional actionable element (rather than different objects identified in a test document). In another example, the computing system may schedule the other web crawler to test the additional actionable element along with testing the resulting web page based on a test document associated with that web page.

At operation 512, additional test results may be accessed. For example, these test results may correspond to results reported by the web crawlers launched to test the additional actionable elements. At operation 514, the quality metric(s) associated with the web page(s) may be generated. For example, the computing system may access the various test results of the different objects of the web page(s) that have been tested. The computing system may analyze these test results to generate the quality metric(s).

The computing system may identify a destination for a web crawler to report a test result. The web crawler may report different types of test results including, for example, whether an object is present, the properties of the object, an outcome of an action defined by the object as applicable, and/or identifiers of objects that were not tested. In addition, a reported test result may use various potential formats. For example, the web crawler may report a success (e.g., the object exists, the property is what is expected, the outcome is what is expected) and/or a failure (e.g., the object does not exist, the property is not what is expected, the outcome is not what is expected) and/or a value (e.g., the found property of the object, the outcome of an action, identifiers of the untested objects). FIG. 6 illustrates an example flow for reporting test results. In particular, the example flow illustrates reporting failures. Nonetheless, the example flow may similarly apply to reporting successes.

The example flow of FIG. 6 may start at operation 602 where an object may be identified from a test document. For example, the web crawler may identify the object and the test that should be performed (e.g., check if the object exists in the web page, check if the property of the object is what is expected, and/or check an outcome of an action defined by the object as applicable). In an example, the web page may be written using a markup language (e.g., hypertext markup language (HTML)). Each of the objects of the web page may be defined by using a markup reference (e.g., HTML tags). In this example, the web crawler may identify the object based on the object's markup reference. The web crawler may then proceed to test the object accordingly.

At operation 604, a determination may be made as to whether the object is present in the web page. For example, the web crawler may parse the web page and compare the tags to the object's tags. If found, that portion of the test may be successful. Otherwise, the web crawler may report at operation 606 that the object may not have been found. Operation 616, described below, for reporting untested objects may follow operation 606.

At operation 608, a determination may be made as to whether a found object may have a particular property. For example, the test document may define the particular property. The markup language of the web page may include attributes of the object (e.g., attributes defined between the object's HTML tags). The web crawler may compare an attribute of the object to the particular property. If the two match, that portion of the test may be successful. Otherwise, the web crawler may report at operation 610 that the property is incorrect.

At operation 612, a determination may be made as to whether an outcome of an action defined by the object is as expected. For example, the test document may define an expected outcome. The web crawler may activate the object, perform the action, determine the outcome, and compare this outcome to the expected outcome. If the two match, that portion of the test may be successful. Otherwise, the web crawler may report at operation 614 that the outcome is incorrect. Operations 602-614 may be repeated for each object identified in a test document.

At operation 616, untested objects may be reported. For example, in addition to identifying objects that should be tested, the test document may identify a range of DOM levels of the web page that should be checked. The web crawler may identify the different objects belonging to these DOM levels and may compare the objects to the ones identified in the test document. Any object that is found in the web page at one of the DOM levels but not identified in the test document may be reported as an untested object.

At operation 618, a next web page may be accessed for testing. This operation illustrates the example where the web crawler moves to a next page upon completing of testing the current web page. In other words, once the various tests defined in the test document of the current page are completed, the web crawler may crawl to the next web page. The next web page may be a part of the crawling path that the computing system may have set for the web crawler.

The computing system may analyze the test results reported by the web crawler to generate different test-related reports. These reports may include, for example, a quality metric, potential bugs, and/or potential changes to the web page. FIG. 7 illustrates an example flow for analyzing the test results and generating the test-related reports.

The example flow of FIG. 7 may start at operation 702, where a test result related to the web page (or to a set of objects thereof) may be accessed. For example, the computing system may access the test result from a destination to which the test result was reported. In another example, the computing system may receive the test result from the web crawler.

At operation 704, a quality metric for the web page may be generated based on the test result. For example, the computing system may analyze the test result to generate the quality metric. The analysis may use a weighted approach for scoring the different results reported in the test result. One score may be defined for a success and another score for a failure. Each of the scores may be weighted based on the underlying test. For instance, a presence of an object may be scored higher than a correct property thereof but lower than an expected actionable outcome. Conversely, an absence of the object may be penalized more than an incorrect property but less than an incorrect actionable outcome. The computing system may identify each of the results, set the respective score, and combine the different scores to generate a total score. This total score may represent a quantitative measure of the quality metric. To generate a qualitative measure, the total score may be compared to ranges of scores, where each range may correspond to a different qualitative measure (e.g., high, medium, low).

At operation 706, a bug associated with an object of the web page may be identified. For example, the web page may have been previously tested. The previous test may indicate that an object of the web page may have failed (e.g., was absent, had an incorrect property, or did not have the proper actionable outcome). The computing system may identify the bug based on one or more factors. One factor may include whether the web page may have been updated since the previous test. Another factor may include testing the object again. The testing may use the same test document or an updated version of the test document. In either case, if the testing results in the same or different failure of the object while the web page may have been updated, the computing system may flag the object as being associated with a potential bug.

At operation 708, a change to the web page may be identified. The change may relate to a particular object of the web page such as a change to the presence or absence of the object, a change to the property, and/or a change to an actionable outcome. In an example, the computing system may compare a test result from previous testing to the current test result of the current testing. If a failure turned into a success or vice versa, the computing system may identify such a change. Similarly, if an object was not previously identified but is currently identified as untested, the computing system may track this change. By identifying the different changes, an administrator may monitor how the objects of the web page may be evolving over time and may allow the administrator to create new test documents or update existing ones.

At operation 710, a report about the quality metric, the bug(s), and the change(s) may be generated. For example, the computing system may generate such a report based on the analysis under operations 704-708. Once generated, the computing system may transmit the report to the client.

The testing of the web page may be based on the respective saturation level. If the saturation level is high (e.g., exceeding a threshold), the web page may have been tested often enough. As such, the testing may be scheduled for a later time when the saturation level is expected to have decreased below the threshold. FIG. 8 illustrates an example flow for scheduling the testing based on the saturation level.

The example flow of FIG. 8 may start at operation 802, where the test document for testing the web page may be received. At operation 804, a saturation level associated with the testing may be determined. For example, the computing system may track the saturation level per web page, set of objects thereof, and/or state used for the testing.

At operation 806, a determination may be made as to whether the web page should be tested. This determination may correspond to determining if and/or when the web page should be tested and may be based upon the saturation level. For example, the computing system may compare the saturation level to a threshold. The threshold may be specific to the web page and/or one or more objects of the web page, and may depend on the relevance of the web page and/or the one or more objects. If the saturation level exceeds the threshold, the web page or objects should not be currently tested. Accordingly, the testing of the web page may be postponed for a period of time as illustrated at operation 808. The period of time may depend on a rate of decay such that once the saturation level no longer exceeds the threshold, the testing may be performed as illustrated at operation 810. As such, operation 808 may be iteratively followed by operation 806 until the saturation level falls below the threshold indicating that the web page should be tested. Alternatively, operation 808 may be immediately followed by operation 810. In this case, the period of time may be set to ensure that the saturation level falls below the threshold upon expiration of the time period.

The comparison of the saturation level and the threshold may be for any type of the saturation level (e.g., per web page, set of objects, and/or state) and the scheduling of the testing may reflect the saturation level type. For example, if the web page has an acceptable saturation level (e.g., the saturation level falling below the threshold) but a particular object does not, that web page may nonetheless be tested but the testing may skip that particular object. Similarly, if a state has an unacceptable saturation level (e.g., the saturation level exceeding the threshold) but another state does not, the web page may be tested using the other state.

At operation 812, the saturation level may be updated. Because the testing may have been performed, the computing system may increase or otherwise update the saturation level. The amount of the increase may depend on the relevance of the web page (e.g., user traffic to the web page, functionality of the web page, or the history of testing of the web page). In addition, the increase may be limited to a particular type of the saturation level (e.g., per web page, set of objects, and/or state) depending on the scope of the testing.

Figure 9:
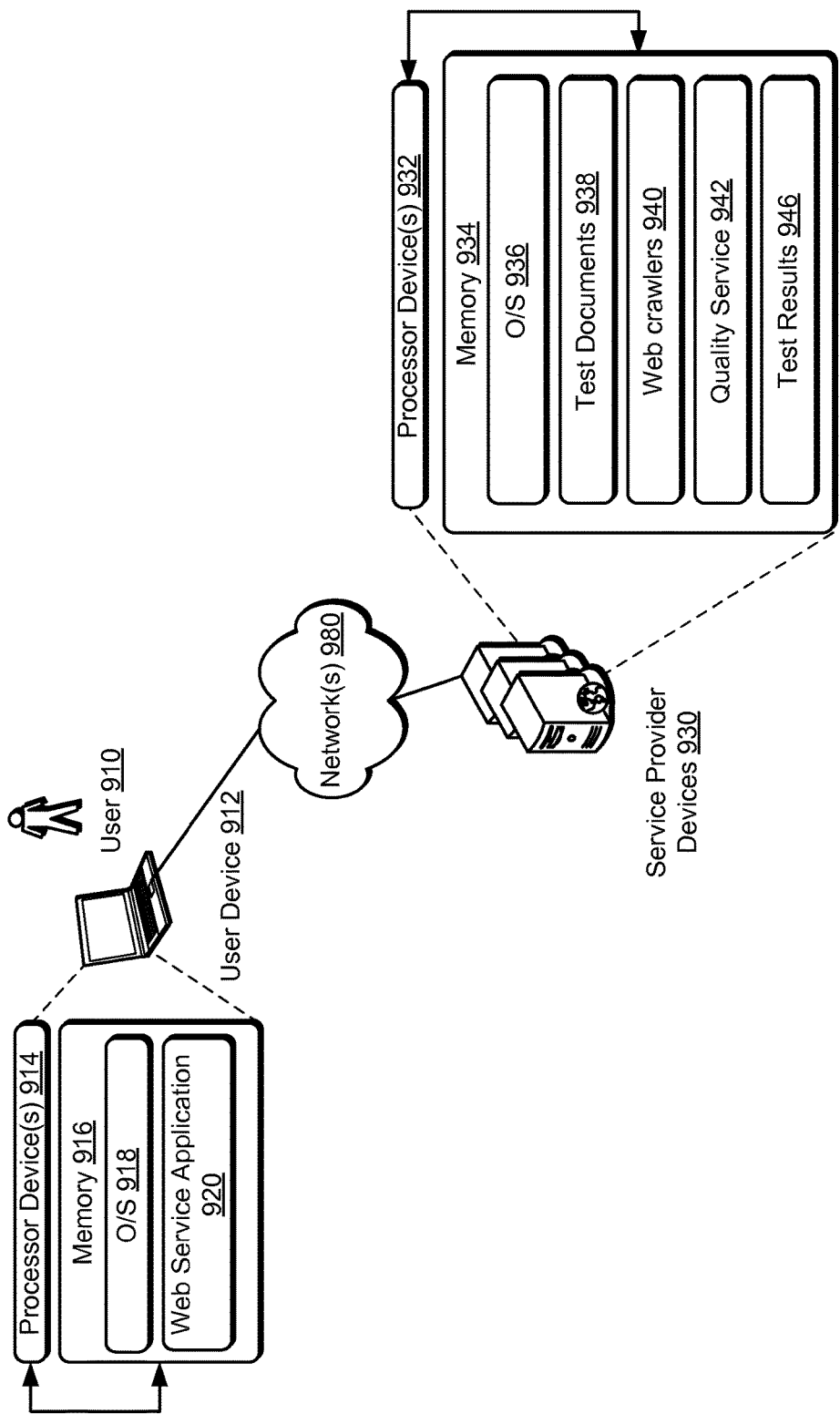
FIG. 9 illustrates an example architecture for testing the online resource, including at least one user device and a service provider device connected via a network, according to embodiments.

Turning to FIG. 9, that figure illustrates an example end-to-end computing environment for testing web pages. In this example, a service provider may implement a quality service for testing the web pages. The quality service may be provided to a user device 912 of a user 910. The testing may involve using test documents and web crawlers.

In a basic configuration, a user 910 may utilize a user device 912 to access local applications, a web service application 920, a user account (e.g., subscription) accessible through the web service application 920, a web site or any other network-based resources via one or more networks 980. In some aspects, the web service application 920, the web site, and/or the user account may be hosted, managed, and/or otherwise provided by one or more computing resources of the service provider, such as by utilizing one or more service provider devices 930. The user 910 may use the local applications and/or the web service application 920 to interact with the network-based resources of the service provider and perform user-related transactions. These transactions may include, for example, generating a test document, identifying a test document, requesting the testing of one or more web pages, and receiving reports of the testing.

In some examples, the user device 912 may be any type of computing devices such as, but not limited to, a mobile phone, a smart phone, a personal digital assistant (PDA), a laptop computer, a thin-client device, a tablet PC, etc. In one illustrative configuration, the user device 912 may contain communications connection(s) that allow the user device 912 to communicate with a stored database, another computing device or server, user terminals, and/or other devices on the networks 980. The user device 912 may also include input/output (I/O) device(s) and/or ports, such as for enabling connection with a keyboard, a mouse, a pen, a voice input device, a touch input device, a display, speakers, a printer, etc.

The user device 912 may also include at least one or more processing units (or processor device(s)) 914 and one memory 916. The processor device(s) 914 may be implemented as appropriate in hardware, computer-executable instructions, firmware, or combinations thereof. Computer-executable instructions or firmware implementations of the processor device(s) 914 may include computer-executable or machine-executable instructions written in any suitable programming language to perform the various functions described.

The memory 916 may store program instructions that are loadable and executable on the processor device(s) 914, as well as data generated during the execution of these programs. Depending on the configuration and type of user device 912, the memory 916 may be volatile (such as random access memory (RAM)) and/or non-volatile (such as read-only memory (ROM), flash memory, etc.). The user device 912 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 916 may include multiple different types of memory, such as static random access memory (SRAM), dynamic random access memory (DRAM), or ROM.

Turning to the contents of the memory 916 in more detail, the memory may include an operating system (O/S) 918 and the one or more application programs or services for implementing the features disclosed herein including the web service application 920. In some examples, the user device 912 may be in communication with the service provider devices 930 via the networks 980, or via other network connections. The networks 980 may include any one or a combination of many different types of networks, such as cable networks, the Internet, wireless networks, cellular networks, and other private and/or public networks. While the illustrated example represents the user 910 accessing the web service application 920 over the networks 980, the described techniques may equally apply in instances where the user 910 interacts with the service provider devices 930 via the user device 912 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, the web service application 920 may allow the user 910 and to interact with the service provider devices 930 to conduct transactions involving items. The service provider devices 930, perhaps arranged in a cluster of servers or as a server farm, may host the web service application 920. These servers may be configured to host a web site (or combination of web sites) viewable via the user device 912. Other server architectures may also be used to host the web service application 920. The web service application 920 may be capable of handling requests from the user device 912 of the user 910 and serving, in response, various interfaces that may be rendered at the user device 912 such as, but not limited to, a web site. The web service application 920 may interact with any type of web site that supports interaction, including social networking sites, electronic retailers, informational sites, blog sites, search engine sites, news and entertainment sites, and so forth. As discussed above, the described techniques may similarly be implemented outside of the web service application 920, such as with other applications running on the user device 912.

The service provider devices 930 may, in some examples, provide network-based resources such as, but not limited to, applications for purchase and/or download, web sites, web hosting, client entities, data storage, data access, management, virtualization, etc. The service provider devices 930 may also be operable to provide web hosting, computer application development, and/or implementation platforms, or combinations of the foregoing to the user 910.

The service provider devices 930 may be any type of computing device such as, but not limited to, a mobile phone, a smart phone, a personal digital assistant (PDA), a laptop computer, a desktop computer, a server computer, a thin-client device, a tablet PC, etc. The service provider devices 930 may also contain communications connection(s) that allow service provider devices 930 to communicate with a stored database, other computing devices or servers, user terminals, and/or other devices on the network 980. The service provider devices 930 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 930 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 930 may be in communication with the user devices 912 via the networks 980, or via other network connections. The service provider devices 930 may include one or more servers, perhaps arranged in a cluster, or as individual servers not associated with one another.

In one illustrative configuration, the service provider devices 930 may include at least one or more processing units (or processor devices(s)) 932 and one memory 934. The processor device(s) 932 may be implemented as appropriate in hardware, computer-executable instructions, firmware, or combinations thereof. Computer-executable instruction or firmware implementations of the processor device(s) 932 may include computer-executable or machine-executable instructions written in any suitable programming language to perform the various functions described.

The memory 934 may store program instructions that are loadable and executable on the processor device(s) 932, as well as data generated during the execution of these programs. Depending on the configuration and type of the service provider devices 930, the memory 934 may be volatile (such as random access memory (RAM)) and/or non-volatile (such as read-only memory (ROM), flash memory, etc.). The service provider devices 930 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 934 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 934 in more detail, the memory may include an operating system (O/S) 936, data related to test documents 938, code for web crawlers 940, code for a quality service 942, and data related to test results 946. Although FIG. 9 illustrates the various data and code as stored in the memory 934, the data or code or portion thereof may be additionally or alternatively stored at a storage device remotely accessible to the service provider devices 930.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a processor; and
a memory comprising instructions that, when executed by the processor, cause the system to at least:
store computer-readable instructions for implementing a plurality of web crawlers;
receive a test document from a computing device, the test document specifying a test for an object of a web page to determine a quality of the web page, the test document further specifying a user state for browsing the web page, and the test identifying an expected outcome associated with performing an action on the object;
store the test document separately from the computer-readable instructions for implementing the plurality of the web crawlers, the test document stored at a network location;
select a web crawler from the plurality of web crawlers based at least in part on the user state, the web crawler configured to access the web page and perform the test based at least in part on the test document;
execute a respective subset of the computer-readable instructions for implementing the plurality of web crawlers to launch the web crawler;
provide the network location and an identifier of the web page to the web crawler, wherein the web crawler accesses the test document from the network location, accesses the web page based at least in part on the identifier and the user state, identifies the object from the test document, and performs the action on the object based at least in part on the test document;
receive a result of the test from the web crawler, the result comprising an indication that an outcome different from the expected outcome occurred based at least in part on the action being performed on the object, the result further identifying a second object of the web page not identified in the test document;
generate a report indicating the quality of the web page based at least in part on the result, the report including a metric for the object and a second metric for the second object based at least in part on the result, the report further identifying a correction to the object such that the expected outcome occurs when the action is performed;
provide the report to the computing device, wherein the web page is updated by at least updating the object according to the correction identified in the report; and
receive a second test document for testing the second object based at least in part on the second metric.

2. The system of claim 1, wherein the object comprises an element of the web page, and wherein the test document comprises a request to at least one of check whether the web page comprises the element or check whether the element has an expected property.

3. The system of claim 1, wherein the object comprises an element that defines the action, and wherein the test document comprises a request to at least one of perform the action or check whether the action results in the expected outcome.

4. The system of claim 3, wherein the web page comprises a second element defining a second action, wherein the test document identifies the second element for testing, and wherein the instructions when executed by the processor further cause the system to at least:
select a second web crawler from the plurality of web crawlers to test the second element based at least in part on the element being tested by the web crawler;
launch the second web crawler to test the second element; and
receive a second result of the test from the second web crawler, and wherein the metric is further generated based at least in part on the second result.

5. A computer-implemented method comprising:
executing code of a network crawler, the executing launching the network crawler, the network crawler configured to access a network document and to perform a test for an object of the network document based at least in part on a test document, the test document stored separately from the code and specifying the test for the object of the network document, the test document further specifying a user state for accessing the network document, and the test identifying an expected outcome associated with performing an action on the object;
providing a network location of the network document and an identifier of the network document to the network crawler, wherein the network crawler accesses the test document from the network location, accesses the network document based at least in part on the identifier and the user state, identifies the object from the test document, and performs the action on the object based at least in part on the test document;
accessing a result of the test performed by the network crawler, the result comprising an indication that an outcome different from the expected outcome occurred based at least in part on the action being performed on the object, the result further identifying a second object of the network document not identified in the test document;
generating a report associated with the network document based at least in part on the result of the test, the report identifying a correction to the object such that the expected outcome occurs when the action is performed, the report further comprising a metric for the second object based at least in part on the result, wherein the network document is updated by at least updating the object according to the correction; and
receiving a second test document for testing the second object based at least in part on the metric.

6. The computer-implemented method of claim 5, wherein the network document is a web page, wherein the network crawler is a web crawler, wherein the result of the test indicates a quality of the web page by further checking one or more of: whether the web page comprises the object, a property of the object, or whether the web page comprises a second object unidentified in the test document.

7. The computer-implemented method of claim 5, further comprising:
storing codes for a plurality of network crawlers that have crawling states and that are configured to crawl web pages based at least in part on the crawling states; and selecting the network crawler from the plurality of network crawlers based at least in part on the user state defined in the test document and a crawling state of the network crawler.

8. The computer-implemented method of claim 5, further comprising:
tracking testing of the network document based at least in part on the network crawler;
determining that the network document was previously tested;
determining a previous test result of the object; and
generating an indication of a bug based at least in part on a comparison of the result of the test with the previous test result.

9. The computer-implemented method of claim 5, wherein the result of the test identifies the second object at a particular document object model level of the network document wherein the second object is untested based at least in part on the test document, and further comprising:
determining that a previous test result associated with the network document does not identify the second object at the particular document object model level;
generating an indication of a bug based at least in part on the second object being identified in the result of the test and unidentified in the previous test result.

10. The computer-implemented method of claim 5, wherein the test document is received from a computing device of an administrator of the network document, and further comprising:
receiving the second test document from the computing device, the second test document specifying a second test for the second object of the network document;
selecting a second network crawler to test the second object based at least in part on the second test document;
identifying different network paths for the network crawler and the second network crawler, the different network paths comprising a network, the network crawler and the second network crawler configured to crawl respective network documents along the different network paths; and
scheduling execution of the network crawler and the second network crawler to test the network document at different times.

11. The computer-implemented method of claim 5, wherein the test document specifies the test for a plurality of objects of the network document, wherein the plurality of objects comprise respective actionable elements, and further comprising:
storing a rule for selecting an actionable element to test, wherein the result of the test performed by the network crawler is based at least in part on the rule; and
launching a second network crawler to test a second object of the plurality of objects based at least in part on the rule.

12. The computer-implemented method of claim 5, and further comprising:
receiving the test document from a computing device of a user based at least in part on a subscription of the user for testing network documents; and
providing the report to the computing device of the user based at least in part on the subscription.

13. A non-transitory computer-readable storage medium comprising instructions that, when executed on a computing system, cause the computing system to perform operations comprising at least:

selecting a web crawler from a plurality of web crawlers based at least in part on a test document, the test document specifying a test for an object of a web page, the test document further specifying a user state for browsing the web page, the test identifying an expected outcome associated with performing an action on the object, the test document stored at a network location separately from code of the web crawler, the web crawler configured to access the web page and to perform the test based at least in part on the test document;
launching the web crawler based at least in part on the web crawler being selected;
providing the network location and an identifier of the web page to the web crawler, wherein the web crawler accesses the test document from the network location, accesses the web page based at least in part on the identifier and the user state, identifies the object from the test document, and performs the action on the object based at least in part on the test document;
receiving a result of the test from the web crawler, the result comprising an indication that an outcome different from the expected outcome occurred based at least in part on the action being performed on the object, the result further identifying a second object of the web page not identified in the test document;
tracking a quality metric associated with the web page based at least in part on the result;
generating a report based at least in part on the result of the test, the report including the quality metric and identifying a correction to the object such that the expected outcome occurs when the action is performed, the report further comprising a metric for the second object based at least in part on the result, wherein the web page is updated by at least updating the object according to the correction; and
receiving a second test document for testing the second object based at least in part on the metric.

14. The non-transitory computer-readable storage medium of claim 13, wherein the quality metric is tracked based at least in part on a state for accessing the web page.

15. The non-transitory computer-readable storage medium of claim 13, wherein tracking the quality metric comprises:
associating the result of the test with the web crawler;
associating the web crawler with the web page;
identifying, for the web page, test results based at least in part on associations between the test results and web crawlers and between the web crawlers and the web page; and
generating the quality metric based at least in part on the test results.

16. The non-transitory computer-readable storage medium of claim 13, wherein the web page is selected for the test based at least in part on a counter that tracks a frequency of testing the object.

17. The non-transitory computer-readable storage medium of claim 16, wherein the web page is selected for the test further based at least in part on a decay applied to the counter according to timings of the testing.

18. The non-transitory computer-readable storage medium of claim 17, wherein the decay and changes to the counter are updated based at least in part on a relevance of the object.

19. The non-transitory computer-readable storage medium of claim 16, wherein the web page is selected for the test and a second web page is deselected for the test based at least in part on an update to a graph, wherein the graph identifies the web page and the second web page for testing, wherein the web crawler is configured to crawl the web page and the second web page based at least in part on the graph, and wherein the update indicates that the web page is subject to the test and the second web page is excluded from the test based at least in part on the counter associated with the web page and a second counter associated with the second web page.

* * * * *